United States Patent
Cho et al.

[11] Patent Number: 5,826,883
[45] Date of Patent: Oct. 27, 1998

[54] SEALING RING WITH DEFORMABLE TUBULAR SHEATH FILLED WITH PERMANENT MAGNETIC GRANULES AND METHOD OF MAKING THE SAME

[75] Inventors: Chahee P. Cho; William P. Krol, Jr., both of Portsmouth; Antonio M. Amaral, East Providence, all of R.I.

[73] Assignee: The United States of America as represesnted by the Secretary of the Navy, Washington, D.C.

[21] Appl. No.: 715,263

[22] Filed: Sep. 16, 1996

[51] Int. Cl.⁶ .................................................... F16J 15/53
[52] U.S. Cl. ............................ 277/80; 277/229; 277/901
[58] Field of Search ................................. 277/1, 80, 201, 277/226, 229, 901, DIG. 9; 49/478.1

[56] References Cited

U.S. PATENT DOCUMENTS

| | | | |
|---|---|---|---|
| 2,619,693 | 12/1952 | Harle | 49/478.1 |
| 2,919,943 | 1/1960 | Kimm | 277/80 |
| 3,124,725 | 3/1964 | Leguillon | 49/478.1 |
| 3,661,197 | 5/1972 | Peterson | 277/226 |
| 4,252,328 | 2/1981 | Raj et al. | 277/226 |
| 5,014,917 | 5/1991 | Sirocky et al. | 277/229 |

FOREIGN PATENT DOCUMENTS

| | | | |
|---|---|---|---|
| 796595 | 1/1981 | Sweden | 277/80 |
| 815382 | 3/1981 | U.S.S.R. | 277/80 |

*Primary Examiner*—Scott Cummings
*Attorney, Agent, or Firm*—Michael J. McGowan; Michael F. Oglo; Prithvi C. Lall

[57] ABSTRACT

There is provided an endless tubular body forming an enclosed chamber therein, and granules of permanent magnet material disposed in the chamber. The body is deformable by the granules when the granules are subjected to a magnetic force. With respect to the aspect of the invention wherein seal assembly technology is the center of interest, there are provided a first member of magnetically permeable material and a second member spaced from the first member to define a passageway therebetween, and the above described sealing ring is disposed in the passageway between the first and second members and in engagement therewith. With respect to the aspect of the of the invention wherein the technology of making a seal assembly is the center of interest, there is provided a method for making the above-described seal assembly.

15 Claims, 2 Drawing Sheets

SEALING RING WITH DEFORMABLE TUBULAR SHEATH FILLED WITH PERMANENT MAGNETIC GRANULES AND METHOD OF MAKING THE SAME

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to seals and seal assemblies, and is directed more particularly to a magnetically active o-ring, an assembly including the o-ring, and to a method for making the assembly.

(2) Description of the Prior Art

One of the most common seals currently in use is the elastomeric o-ring. A typical o-ring is annularly-shaped and in cross-section, shown in FIG. 1, is round in configuration. Such o-rings O customarily are of solid elastomeric composition and usually are placed between two members, A and B, which define therebetween a passageway P. O-ring O typically is disposed in a groove in one of the members A, B, as shown in FIG. 1. Such o-rings effect a seal through their mechanical make-up, being of elastomeric material and squeezed into a confined space. Aside from the mechanical press of the o-ring O against the sealed members A, B, there is no attraction between the members A, B and the o-ring, and, in due course, the o-ring looses its elasticity and/or gives way to fluid pressure acting thereagainst. It is deemed beneficial to have an o-ring wherein the o-ring is self-biased into engagement with one or both of the members between which the o-ring is disposed.

When there is vibration of either member A, B, the o-ring provides only minimal damping of the vibration and, in due course, is worn down by such vibration. Thus, it is further deemed beneficial to provide an o-ring which offers improved damping ability and is therefore more resistant to failure attributable to vibrational wear.

There is further a need for a seal assembly wherein the above-described o-ring can be used effectively. There is still further a need for a method for making such a seal assembly.

SUMMARY OF THE INVENTION

It is, therefore, an object of the invention to provide a sealing ring which is actively self-biased into engagement with one or more members adjacent thereto.

A further object of the invention is to provide a seal assembly including, as one component thereof, the above-mentioned sealing ring.

A still further object of the invention is to provide a method for making the aforementioned seal assembly.

With the above and other objects in view, as will hereinafter appear, a feature of the present invention is the provision of a sealing ring comprising an endless tubular elastomeric body forming an enclosed chamber therein, and granules of permanent magnet material disposed in the chamber. The body is deformable by the granules when the granules are subjected to a magnetic force.

In accordance with a further feature of the invention, there is provided a seal assembly comprising a first member of magnetically permeable material, and a second member spaced from the first member to define therebetween a passageway. An o-ring is disposed in the passageway, between the first and second members and engaged therewith, the o-ring being tubular and having therein granules of permanent magnet material. The granules are magnetically attracted to the first member, such that portions of the o-ring are urged into increased engagement with the first member.

In accordance with a still further feature of the invention, there is provided a method for making a seal assembly, the method comprising the steps of providing first and second members between which a seal is to be effected, the first member being magnetically permeable and electrically conductive, providing an o-ring comprising an endless tubular elastomeric body forming an enclosed chamber, and granules of permanent magnet material disposed in the chamber, and placing the o-ring between the first and second members such that first surface portions of the O-ring are in engagement with the first member and second surface portions of the o-ring are in engagement with the second member. The o-ring granules are magnetically attracted to the first member and deform the o-ring to increase the first surface portions in engagement with the first member. Vibrations of the first member relative to the granules induces a current in the first member which generates a magnetic field which, in cooperation with a magnetic field generated by the granules, operates to damp the vibration.

The above and other features of the invention, including various novel details of construction and combinations of parts, will now be more particularly described with reference to the accompanying drawings and pointed out in the claims. It will be understood that the particular sealing rings, seal assembly, and method for making a seal assembly, embodying the present invention, are shown and/or described by way of illustration only and not as limitations of the invention. The principles and features of this invention may be employed in various and numerous embodiments without departing from the scope of the invention.

BRIEF DESCRIPTION OF THE DRAWINGS

The accompanying drawings show illustrative embodiments of the inventions. A better understanding of the invention and its novel features and advantages may be had by reference to the following detailed description when considered in light of the accompanying drawings wherein.

DESCRIPTION OF THE PREFERRED EMBODIMENTS

Figure 2:
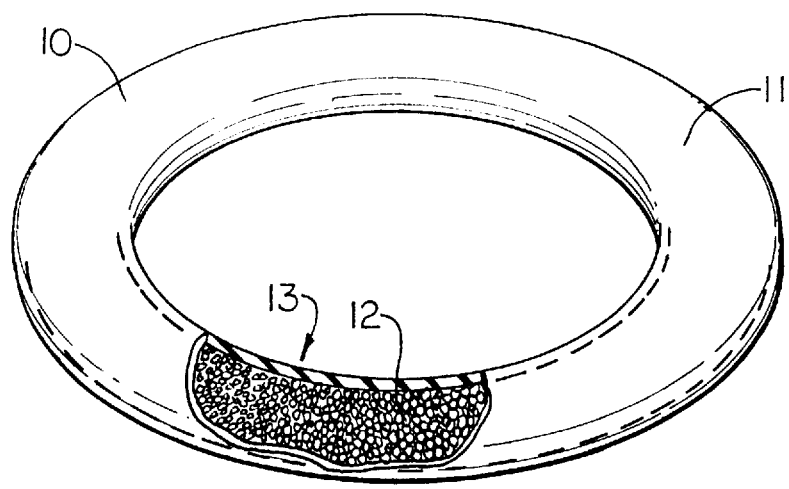
FIG. 2 is a perspective view of a sealing ring illustrative of an embodiment of the invention.

Referring to FIG. 2, it will be seen that an illustrative sealing ring comprises an o-ring 10 including an endless tubular elastomeric body 11 forming an endless enclosed chamber 13. Granules 12 of permanent magnet material are disposed in the chamber 13 and substantially fill the chamber. The body 11 is deformable by granules 12 when the granules are subjected to a magnetic force. The granules 12, in an inactive state, are randomly oriented with respect to magnetic orientation.

The body 11 preferably is of an elastomeric material, such as rubber, plastics, teflon, compounds thereof, and the like, and the granules are of a magnetic material, such as Neodymium-Boron-Iron (NdBFe), Samarium-Cobalt (SmCo), Ferrite, and the like.

Figure 1:
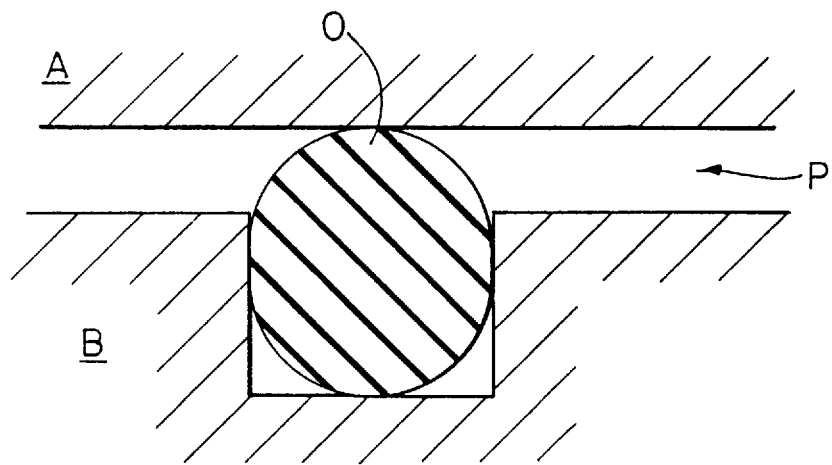
FIG. 1 is a cross-sectional view of a prior art o-ring disposed between two members.
Figure 3:
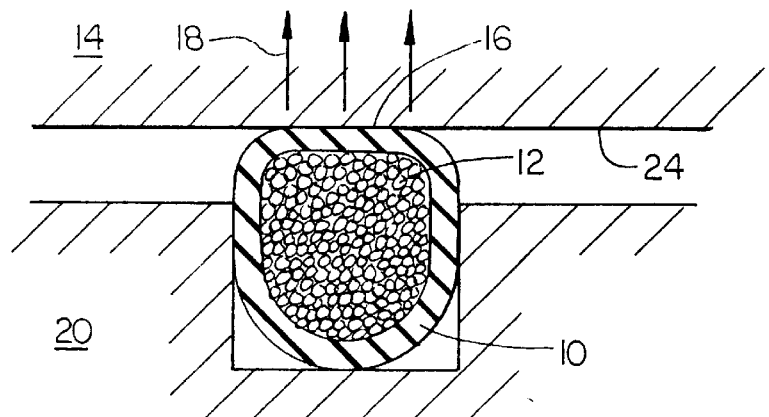
FIG. 3 is a cross-sectional view of the inventive sealing ring shown in position between two opposed members, and shows a sealing assembly illustrative of an embodiment of the invention.

Referring to FIG. 3, it will be seen that sealing ring 10 is disposed similarly to o-ring O of FIG. 1, that is, between members 14 and 20, typically in a groove in one of the members. Member 14 is of magnetically permeable material and attraction 18 between member 14 and granules 12 is realized. Such attraction 18 biases granules 12 toward member 14. Inasmuch as body 11 is elastomeric and deformable, a surface portion 16 of body 11 is urged into increased engagement with member 14, and is enlarged by spreading against the surface of member 14.

Figure 4:
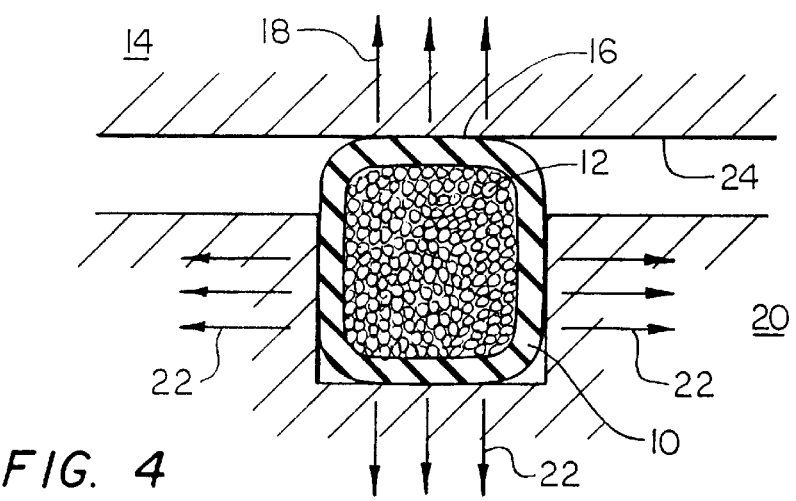
FIG. 4 is similar to FIG. 3, but is illustrative of an alternative embodiment of sealing assembly.

If member 20 is also of a magnetically permeable material, other surface portions of body 11 are similarly urged by magnetic attraction 22 of granules 12 toward member 20 into increased engagement with member 20, the body 11 deforming to increase area and force of contact with member 20, as shown in FIG. 4.

Figure 5:
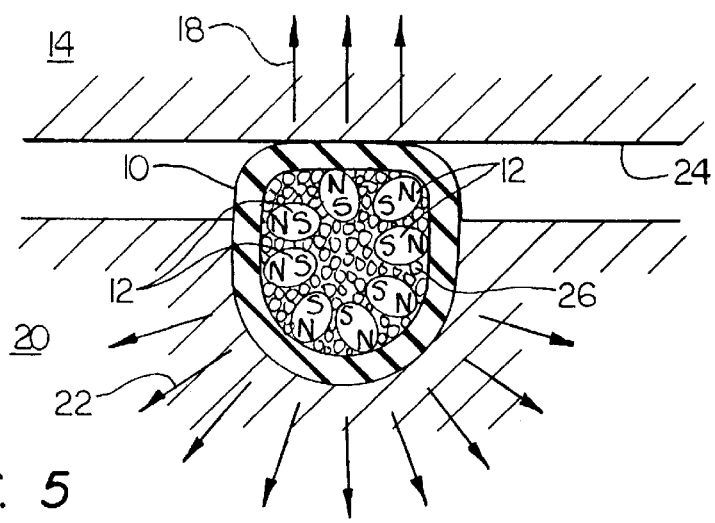
FIG. 5 is similar to FIG. 4, but is illustrative of an alternative embodiment of sealing ring.

In FIG. 5, there is shown an alternative embodiment in which chamber 13 is filled with a mixture of granules 12 and powdered non-magnetic material 26, such as one or more of plastics, rubber, and teflon. The granules 12 are embedded in the powdered material 26 in random fashion. Prior to use, the granules 12 and powdered material 26 are permanently magnetized such that granules 12 are fixed in place, with respect to magnetic orientation, in the powdered material. Utilizing this embodiment, granules 12 may, for example, be oriented magnetically such that the north pole N of each of granules 12 is disposed proximate an outside periphery of body 11, and the south pole S of each of the granules 12 is disposed closer to a center of the body than to the outer periphery thereof. Such orientation could well be selected with reversal of the poles.

In the embodiment shown in FIG. 5, each magnetically permeable member of the members 14, 20 can attract magnetically active granules 12, to increase the seal between the body 11 and the surfaces of members 14, 20 engaged thereby.

In the event that one or more of the members 14, 20 starts to vibrate relative to body 11, as for example, member 14 shown in FIG. 3, the movement of electrical conductor 14 relative to the magnetic field developed by granules 12 creates an electrical current in member 14, which in turn, creates a magnetic field in and around member 14.

It is well known in the art that electromagnetic force induced in a material, such as member 14, relates to the rate of change of magnetic flux through the material. There are three parameters of particular importance: the surface area of member 14 exposed to the sealing ring's magnetic flux, the relative speed between the sealing ring 10 and member 14, and the sealing ring's field strength. Thus, relatively rapid vibrational movements induce a larger current, and a larger surface area of material A permits more flux lines to induce larger currents and voltages in the material A.

The surface area affected also relates to the direction of relative motion of the sealing ring 10 and member 14. If the relative movement of ring 10 is along the axis of member 14 (into and out of the page as shown in FIG. 3), the surface 16 along the length of the member A will generate current and a magnetic field in member A. If the motion is rotational (in the plane of the page of FIG. 3), it is the cylindrical surface area about the sealing ring 10 which generates the current and magnetic field. In either case, the magnetic field generated by material A opposes either the linear or rotational motion of sealing ring 10. In this way, member A opposes vibratory motion, both rotational and linear.

There is thus provided a sealing ring which is actively self-biased into engagement with one or more members adjacent thereto, and a seal assembly with improved sealing characteristics and, in addition, can absorb reciprocal vibration along the axis of the sealing ring and rotary motion about the axis of the sealing ring. There is further provided a method for making the improved seal assembly.

It is to be understood that the present invention is by no means limited to the particular constructions and method herein disclosed and/or shown in the drawings, but also comprises any modifications or equivalents within the scope of the claims. For example, while the sealing member 10 is shown as being annular in configuration and round in cross-section, and while such configuration and cross-section is expected to be preferable for most applications, it is not necessary for purposes of the invention that the sealing member be limited to such configuration and cross-section. Indeed, virtually any closed-loop configuration and any cross-sectional shape is encompassed within the inventive concept disclosed herein. Thus, the term "o-ring" is not intended to limit the configuration of the sealing ring to circular.

What is claimed is:

1. A sealing ring comprising:
   an endless tubular body made of a material having elastomeric properties and forming an enclosed chamber therein;
   granules of permanent magnet material and powdered non-magnetic material disposed in said chamber and wherein said granules of permanent magnetic material are embedded in random fashion in said powdered material; and
   said body being deformable by said granules when said granules are subjected to a magnetic force.

2. The sealing ring in accordance with claim 1 wherein said material is chosen from the group consisting of rubber, plastics, and teflon.

3. The sealing ring in accordance with claim 1 wherein said magnet material is chosen from the group consisting of NdBFe, SmCo, and Ferrite.

4. The sealing ring in accordance with claim 1 wherein said granules are permanently magnetized and fixed in place with respect to magnetic orientation.

5. The sealing ring in accordance with claim 4 wherein a selected one of north and south poles of each of said granules is disposed proximate a periphery of said body, and the other of said north and south poles of each of said granules is disposed closer to a center of said body than to said periphery of said body.

6. The sealing ring in accordance with claim 1 wherein said non-magnetic material is chosen from the group consisting of plastics, rubber, and teflon or mixtures thereof.

7. The sealing ring in accordance with claim 1 wherein said chamber is endless.

8. The sealing ring in accordance with claim 4 wherein said chamber is substantially filled with said granules and said powdered material.

9. A seal assembly comprising:
   a first member of magnetically permeable material;

a second member spaced from said first member to define therebetween a passageway; and an o-ring disposed in said passageway between said first and second members and engaged therewith, said o-ring being tubular and having therein granules of permanent magnet material, said granules being magnetically attracted to said first member such that portions of said o-ring are urged into increased engagement with said first member.

10. The seal assembly in accordance with claim 9 wherein said second member is of magnetically permeably material and said granules are magnetically attracted to said second member such that other portions of said o-ring are urged into increased engagement with said second member.

11. The seal assembly in accordance with claim 9 wherein a selected one of said first and second members is provided with a groove and said o-ring is disposed in said groove and engaged with the other of said members.

12. A method for making a seal assembly, said method comprising the steps of:

providing first and second members between which a seal is to be effected, said first member being magnetically permeable and electrically conductive;

providing an o-ring comprising an endless tubular elastomeric body forming an enclosed chamber therein, and granules of permanent magnet material disposed in said chamber;

placing said o-ring between said first and second members and having first surface portions of said o-ring in engagement with said first member and second surface portions in engagement with said second member;

wherein said o-ring granules are magnetically attracted to said first member and deform said o-ring to increase said first surface portion in engagement with said first member; and wherein vibration of said first member relative to said granules induces a current in said first member which generates a magnetic field which, in cooperation with a magnetic field generated by said granules, operates to damp said vibration.

13. The method in accordance with claim 12 wherein the step of providing said second member comprises providing a magnetically permeable and electrically conductive second member.

14. The method in accordance with claim 12, including the step of providing said o-ring wherein in said chamber there are disposed said granules embedded in powdered non-magnetic material.

15. The method in accordance with claim 14, including the step of permanently magnetizing said o-ring, such that like poles of said granules extend in a selected direction.

* * * * *